Patented Dec. 4, 1945

2,390,100

UNITED STATES PATENT OFFICE 2,390,100

HYDROCARBON POLYMERIZATION

Everett C. Hughes, Cleveland Heights, Ohio, assignor to The Standard Oil Company, Cleveland, Ohio, a corporation of Ohio No Drawing. Application October 24, 1941,
Serial No. 416,389

14 Claims. (Cl. 260—683.15)

This invention relates to polymerization of hydrocarbons, and it is among the objects of the invention to provide accuracy of control and corresponding attainment of products of desired extent of polymerization without inconsistent mixture. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the invention, polymerization of hydrocarbons is carried out with the presence of a promoter which is also a reducing agent. It is not wholly clear what the detail of the reason for the action may be, but promoters of this character exert a particular action in contrast to the promoters commonly known in the art, and the products are capable of having definitely selected properties. The catalyst may be as known for polymerizing action, such as halide catalysts, for instance boron fluoride advantageously, and in polymerizing hydrocarbons, such as olefines, the catalyst may be employed in amounts of 0.1–25 mol per cent. Ethylene, propylene, butenes, higher boiling olefines etc. may be operated upon. These may be relatively pure if desired, or may be in mixtures. The olefines may be diluted by the presence of the corresponding paraffins or with other inert hydrocarbons. Fractionated refinery gases containing paraffins and olefines may be applied without separation. The promoters employed in accordance with the present invention are reducing agents, examples being ferrous oxide, ferrous silicate, ferrous sulphite, sodium sulphite, hydrazines, chromous oxide, manganous oxide, phosphorus, titanium compounds in which the valence of titanium is less than 4, etc. These promoters may be applied in amounts of 0.05–5 mol per cent based on the olefine present. A water content of 0.3 to 4 mols of water per mol of reducing promoter is also desirable. This may be provided by passing water-saturated air or inert gas over the oxide, or by controlled drying of a wet precipitate or other solid. It is to be noted that the water is thus desirably in form of hydration rather than free mixture. Promoters of a different type may also be used advantageously with the present promoters. For instance, oxides and compounds of metals on atomic numbers 13, 14 and 22–28, such as alumina, hydrated clays, etc., or alcohols, t-amyl chloride, etc. may be provided, as in amount of 0.05–5 mol per cent. Operating pressures up to about 300 pounds per square inch may be employed, at temperatures of −100 to plus 120° F. for instance, and in polymerizing propylene to lubricating oils preferably 80° F.

As an example: A mixture of 25.5 per cent propylene in propane is subjected to the action of 14 mol per cent of boron fluoride, at a temperature of 80° F. and 175 pounds pressure per square inch, and as promoter 1.0 mol per cent of hydrated ferrous silicate with 23.5 per cent water. After two and one-fourth hours subjecting such with agitation to the catalyst and reducing promoter, the product showed a 96.9 per cent conversion, which fractionated to 11.2 per cent boiling at less than 500° F. at atmospheric pressure, 6.3 per cent less than 300° F. at 15 mm. mercury, 25.5 per cent at 300–395° F. at 15 mm. mercury, and 57.7 per cent of vacuum residue. This residue had a viscosity of 64.47 centistokes at 100° F. and 7.0 centistokes at 210° F., the viscosity index being 61.1.

As another example: Propylene in mixture with propane was similarly polymerized in the presence of boron fluoride and a reducing promoter of 1 mol per cent of phosphorus. After a similar run, the product showed 95.3 per cent conversion, of which on fractionation 8.8 per cent boiled at less than 500° F. at atmospheric pressure, 6.3 per cent at less than 300° F. at 15 mm. mercury, 35.0 per cent at 300–395° F. at 15 mm. mercury, and the vacuum residue was 45.2 per cent. The viscosity of the latter at 100° F. was 77.39 centistokes, and at 210° F. was 8.258 centistokes, the viscosity index being 78.6.

In comparison, without the promoters but the conditions being otherwise as in the foregoing examples only about 20 per cent of propylene is polymerized and of the product only about 6 per cent is oil.

Other modes of applying the principle of the invention may be employed, change being made as regards the details described, provided the features stated in any of the following claims, or the equivalent of such, be employed.

I therefore particularly point out and distinctly claim as my invention:

1. In a process of the character described, polymerizing an olefin to a liquid product by a halide catalyst promoted by ferrous silicate.

2. In a process of the character described, polymerizing an olefin to a liquid product by a halide catalyst promoted by ferrous oxide.

3. In a process of the character described, polymerizing an olefin to a liquid product by a halide catalyst promoted by a ferrous compound.

4. In a process of the character described, polymerizing propylene to a liquid product by a halide catalyst and hydrated ferrous silicate.

5. In a process of the character described, polymerizing propylene to a liquid product by a halide catalyst and a ferrous compound.

6. In a process of the character described, polymerizing an olefin in the presence of boron fluoride and ferrous silicate.

7. In a process of the character described, polymerizing an olefin in the presence of boron fluoride and ferrous oxide.

8. In a process of the character described, polymerizing an olefin in the presence of boron fluoride and a ferrous compound.

9. A process of the character described, which comprises polymerizing an olefin at a temperature to obtain high yields of a polymer having a viscosity not greater than that of a lubricating oil, by contacting the olefin with 0.1 to 25 mol per cent boron fluoride as a catalyst while promoting the activity thereof with 0.05 to 5 mol per cent of a ferrous compound, the amount of said ferrous compound being less than the amount of said fluoride.

10. A process of the character described, which comprises polymerizing an olefin at a temperature to obtain high yields of a polymer having a viscosity not greater than that of a lubricating oil, by contacting the olefin with 0.1 to 25 mol per cent boron fluoride as a catalyst while promoting the activity thereof with 0.05 to 5 mol per cent of a ferrous compound, the amount of said ferrous compound being less than the amount of said fluoride, together with 0.3 to 4 mols of water per mol of ferrous compound.

11. A process of the character described, which comprises polymerizing an olefin at a temperature to obtain high yields of a polymer having a viscosity not greater than that of a lubricating oil, by contacting the olefin with 0.1 to 25 mol per cent boron fluoride as a catalyst while promoting the activity thereof with 0.05 to 5 mol per cent of ferrous silicate, the amount of said ferrous silicate being less than the amount of said fluoride.

12. A process of the character described, which comprises polymerizing an olefin at a temperature to obtain high yields of a polymer having a viscosity not greater than that of a lubricating oil, by contacting the olefin with 0.1 to 25 mol per cent boron fluoride as a catalyst while promoting the activity thereof with 0.05 to 5 mol per cent of ferrous silicate, the amount of said ferrous silicate being less than the amount of said fluoride, together with 0.3 to 4 mols of water per mol of ferrous silicate.

13. A process of the character described, which comprises polymerizing an olefin at a temperature to obtain high yields of a polymer having a viscosity not greater than that of a lubricating oil, by contacting the olefin with 0.1 to 25 mol per cent boron fluoride as a catalyst while promoting the activity thereof with 0.05 to 5 mol per cent of ferrous oxide, the amount of said ferrous oxide being less than the amount of said fluoride.

14. A process of the character described, which comprises polymerizing an olefin at a temperature to obtain high yields of a polymer having a viscosity not greater than that of a lubricating oil, by contacting the olefin with 0.1 to 25 mol per cent boron fluoride as a catalyst while promoting the activity thereof with 0.05 to 5 mol per cent of ferrous oxide, the amount of said ferrous oxide being less than the amount of said fluoride, together with 0.3 to 4 mols of water per mol of ferrous oxide.

EVERETT C. HUGHES.